United States Patent
Kwak et al.

(10) Patent No.: US 11,470,593 B2
(45) Date of Patent: Oct. 11, 2022

(54) METHOD FOR TRANSMITTING/RECEIVING DOWNLINK CONTROL INFORMATION AND DEVICE THEREFOR

(71) Applicant: LG Electronics Inc., Seoul (KR)

(72) Inventors: Kyuhwan Kwak, Seoul (KR); Seungmin Lee, Seoul (KR); Hyunho Lee, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 16/649,018

(22) PCT Filed: Sep. 28, 2018

(86) PCT No.: PCT/KR2018/011512
§ 371 (c)(1),
(2) Date: Mar. 19, 2020

(87) PCT Pub. No.: WO2019/066540
PCT Pub. Date: Apr. 4, 2019

(65) Prior Publication Data
US 2020/0296698 A1 Sep. 17, 2020

Related U.S. Application Data

(60) Provisional application No. 62/565,058, filed on Sep. 28, 2017.

(51) Int. Cl.
*H04W 72/04* (2009.01)

(52) U.S. Cl.
CPC .................... *H04W 72/042* (2013.01)

(58) Field of Classification Search
CPC .......................................... H04W 72/042
See application file for complete search history.

(56) References Cited

U.S. PATENT DOCUMENTS

| | | | |
|---|---|---|---|
| 2007/0220151 A1* | 9/2007 | Li | H04L 5/0064 |
| 2011/0105162 A1* | 5/2011 | Kim | H04L 5/0053 |
| 2013/0064172 A1* | 3/2013 | Park | H04B 7/155 |
| 2019/0141679 A1* | 5/2019 | He | H04W 72/04 |

(Continued)

OTHER PUBLICATIONS

Interdigital, Inc., "Considerations for ultra-reliable DCI transmission," R1-1714113, 3GPP TSG-RAN WG1 Meeting #90, Prague, Czech Republic, dated Aug. 21-25, 2017, 4 pages.

(Continued)

*Primary Examiner* — Ronald B Abelson
(74) *Attorney, Agent, or Firm* — Fish & Richardson P.C.

(57) ABSTRACT

The present disclosure provides a method for a terminal to receive downlink control information (DCI) in a wireless communication system. Particularly, the method is characterized in that DCI is received through one or more control channel elements (CCE) based on an aggregation level for a physical downlink control channel (PDCCH), wherein each of the one or more CCEs includes a plurality of resource element groups (REG), each of the plurality of REGs includes a plurality of resource elements (RE), and the DCI is mapped to a first RE included in a first REG and then to a second RE included in a second REG.

9 Claims, 11 Drawing Sheets

(A) CONTROL-PLANE PROTOCOL STACK (B) USER-PLANE PROTOCOL STACK

(56) References Cited

U.S. PATENT DOCUMENTS

2020/0022121 A1\* 1/2020 Li .................. H04L 5/0094

OTHER PUBLICATIONS

NEC, "Control channel structure for NR," R1-1701883, 3GPP TSG-RAN WG1 Meeting #87, Athens, Greece, dated Feb. 13-17, 2017, 4 pages.
Nokia, Nokia Shanghai Bell, "On the remaining details of PDCCH reference signal structure," R1-1714058, 3GPP TSG-RAN WG1#90, Prague, Czech Republic, dated Aug. 21-25, 2017, 6 pages.
PCT International Search Report and Written Opinion in International Application No. PCT/KR2018/011512, dated Jan. 10, 2019, 21 pages (with English translation).
Qualcomm Incorporated, "sPDCCH Design for Shortened TTI," R1-1712779, 3GPP TSG RAN WG1 #90, Prague, Czech Republic, dated Aug. 21-25, 2017, 12 pages.
Vivo, "Discussion on search space and blind decoding design," R1-1712847, 3GPP TSG RAN WG1 Meeting #90, Prague, Czech Republic, dated Aug. 21-25, 2017, 6 pages.

\* cited by examiner (A) CONTROL-PLANE PROTOCOL STACK (B) USER-PLANE PROTOCOL STACK (a) 1TX or 2TX (b) 4 TX

METHOD FOR TRANSMITTING/RECEIVING DOWNLINK CONTROL INFORMATION AND DEVICE THEREFOR

CROSS-REFERENCE TO RELATED APPLICATIONS

This application is a National Stage application under 35 U.S.C. § 371 of International Application No. PCT/KR2018/011512, filed on Sep. 28, 2018, which claims the benefit of U.S. Provisional Application No. 62/565,058, filed on Sep. 28, 2017. The disclosures of the prior applications are incorporated by reference in their entirety.

TECHNICAL FIELD

The present disclosure relates to a method of transmitting and receiving downlink control information and an apparatus therefor and, more specifically, to a method of distributively mapping modulation symbols of downlink control information to control channel elements (CCEs) and an apparatus therefor.

BACKGROUND ART

3GPP LTE (3rd generation partnership project long term evolution hereinafter abbreviated LTE) communication system is schematically explained as an example of a wireless communication system to which the present disclosure is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DETAILED DESCRIPTION OF THE DISCLOSURE

Technical Problems

The present disclosure provides a method of transmitting and receiving downlink control information and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of receiving downlink control information (DCI) by a user equipment (UE) in a wireless communication system, including receiving the DCI through at least one control channel element (CCE) based on an aggregation level for a physical downlink control channel (PDCCH), wherein each of the at least one CCE includes a plurality of resource element groups (REGs) and each of the plural REGs includes a plurality of resource elements (REs), and the DCI is mapped to a first RE included in a first REG and then is mapped to a second RE included in a second REG.

The first REG and the second REG may be included in different CCEs.

An index of a CCE in which the first REG is included and an index of a CCE in which the second REG is included may have an interval corresponding to a specific offset.

The DCI may be cyclically mapped to the at least one CCE based on a modulo operation related to the aggregation level.

An index of the first REG and an index of the second REG may have an interval corresponding to a specific offset.

The DCI may be cyclically mapped to the plural REGs based on a modulo operation related to the aggregation level.

A first modulation symbol of the DCI may be mapped to the first RE and a second modulation symbol of the DCI may be mapped to the second RE.

In another aspect of the present disclosure, provided herein is a user equipment (UE) for receiving downlink control information (DCI) in a wireless communication system, including a transceiver configured to transmit and receive a radio signal to and from a base station (B S); and a processor configured to control the transceiver, wherein the processor controls the transceiver to receive the DCI through at least one control channel element (CCE) based on an aggregation level for a physical downlink control channel (PDCCH), each of the at least one CCE includes a plurality of resource element groups (REGs) and each of the plural REGs includes a plurality of resource elements (REs), and the DCI is mapped to a first RE included in a first REG and then is mapped to a second RE included in a second REG.

The first REG and the second REG may be included in different CCEs.

An index of a CCE in which the first REG is included and an index of a CCE in which the second REG is included may have an interval corresponding to a specific offset.

The DCI may be cyclically mapped to the at least one CCE based on a modulo operation related to the aggregation level.

An index of the first REG and an index of the second REG may have an interval corresponding to a specific offset.

The DCI may be cyclically mapped to the plural REGs based on a modulo operation related to the aggregation level.

A first modulation symbol of the DCI may be mapped to the first RE and a second modulation symbol of the DCI may be mapped to the second RE.

In another aspect of the present disclosure, provided herein a method of transmitting downlink control information (DCI) by base station (BS) in a wireless communication system, including sequentially mapping the DCI to a first resource element (RE) of a first resource element group (REG) and a second RE of a second REG, the first REG and the second REG being included in at least one CCE based on an aggregation level for a physical downlink control channel (PDCCH), and transmitting the DCI mapped to the at least one CCE, wherein each of the at least one CCE includes a plurality of REGs and each of the plural REGs includes a plurality of REs.

Advantageous Effects

According to the present disclosure, modulation symbols of downlink control information are mapped by distributing the modulation symbols on respective control channel elements constituting a downlink control channel so that ambiguity that may occur when a UE detects the downlink control information may be reduced.

It will be appreciated by persons skilled in the art that that the effects that can be achieved through the present disclosure are not limited to what has been particularly described hereinabove and other advantages of the present disclosure will be more clearly understood from the following detailed description.

MODE FOR CARRYING OUT THE DISCLOSURE

In the following description, compositions of the present disclosure, effects and other characteristics of the present disclosure can be easily understood by the embodiments of the present disclosure explained with reference to the accompanying drawings. Embodiments explained in the following description are examples of the technological features of the present disclosure applied to 3GPP system.

In this specification, the embodiments of the present disclosure are explained using an LTE system and an LTE-A system, which is exemplary only. The embodiments of the present disclosure are applicable to various communication systems corresponding to the above mentioned definition. In particular, although the embodiments of the present disclosure are described in the present specification on the basis of FDD, this is exemplary only. The embodiments of the present disclosure may be easily modified and applied to H-FDD or TDD.

Figure 1:
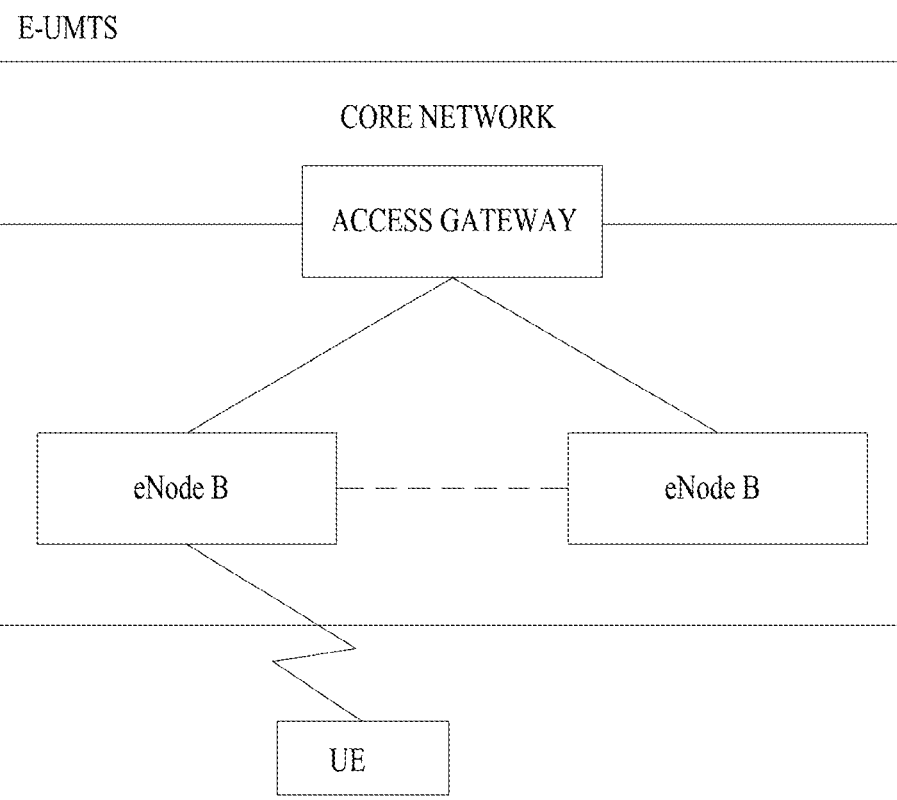
FIG. 1 is a diagram showing a network structure of an evolved universal mobile telecommunications system (E-UMTS) as a mobile communication system.
Figure 2:
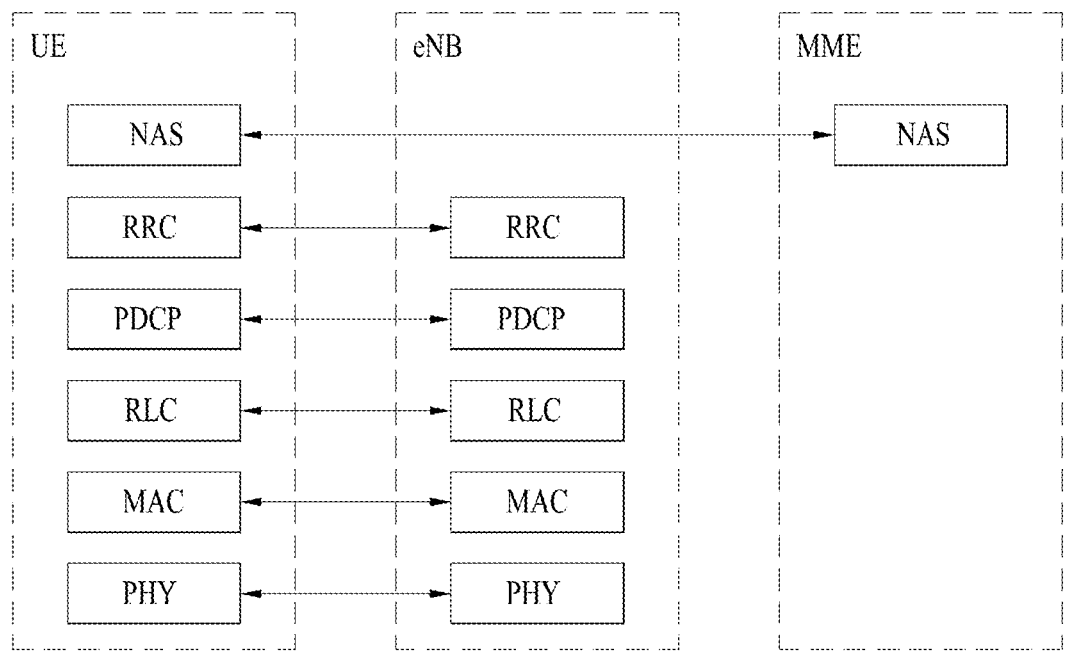
FIG. 2 shows a control plane and a user plane of a radio interface protocol between a UE and an evolved universal terrestrial radio access network (E-UTRAN) based on a 3GPP radio access network standard.
Figure 2:
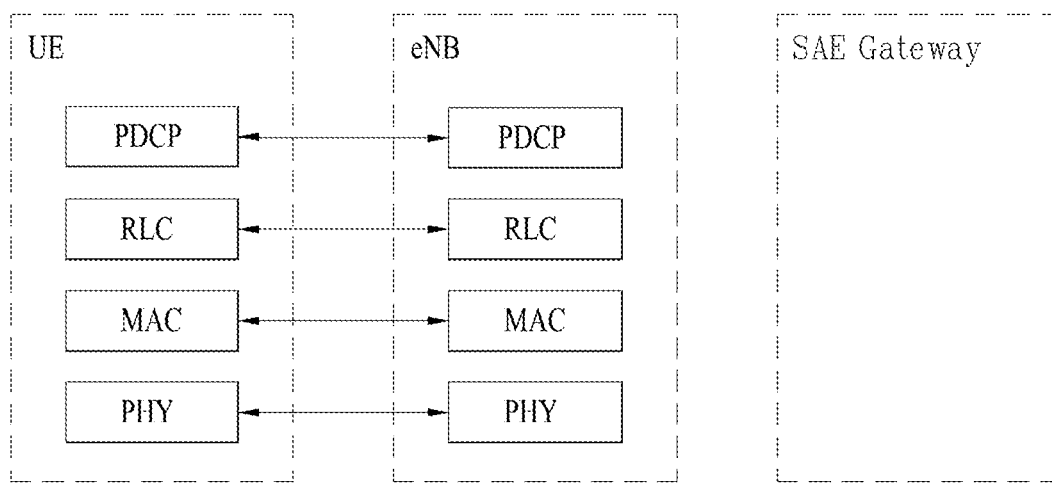

FIG. 2 shows a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. If an RRC connection is established between the UE and the E-UTRAN, the UE is in RRC Connected mode and otherwise, the UE is in RRC idle mode. A non-access stratum (NAS) layer above the RRC layer performs functions including session management and mobility management.

One cell of the eNB is set to use a bandwidth such as 1.25, 2.5, 5, 10, 15, or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
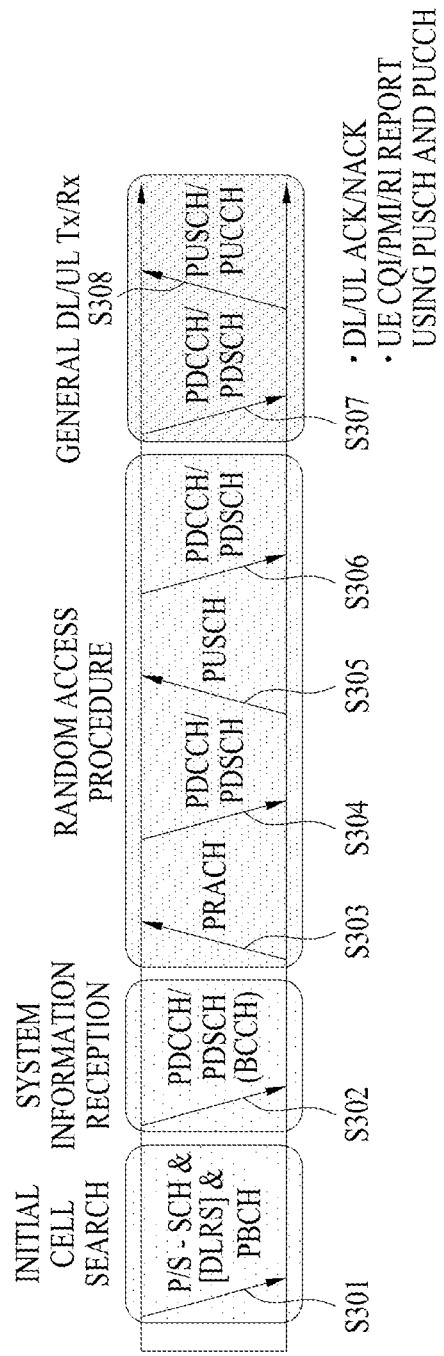
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a downlink reference signal (DL RS) so as to confirm a downlink channel state in the initial cell search step.

The UE which completes the initial cell search may receive a physical downlink control channel (PDCCH) and a physical downlink shared channel (PDSCH) according to information included in the PDCCH so as to acquire more detailed system information (S302).

Meanwhile, if the eNB is initially accessed or radio resources for signal transmission are not present, the UE may perform a random access procedure (RACH) (step S303 to S306) with respect to the eNB. In this case, the UE may transmit a specific sequence through a physical random access channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
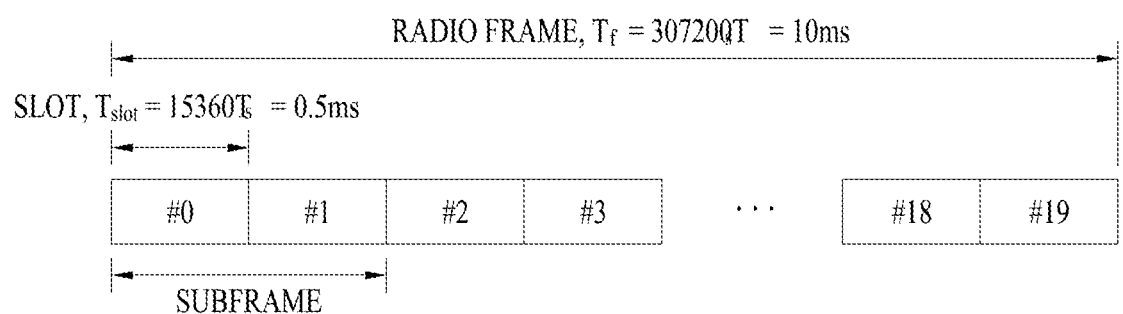
FIG. 4 illustrates an exemplary control channel included in the control region of a subframe in a radio frame.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s = 1/(15 \text{ kHz} \times 2048) = 3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A transmission time interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
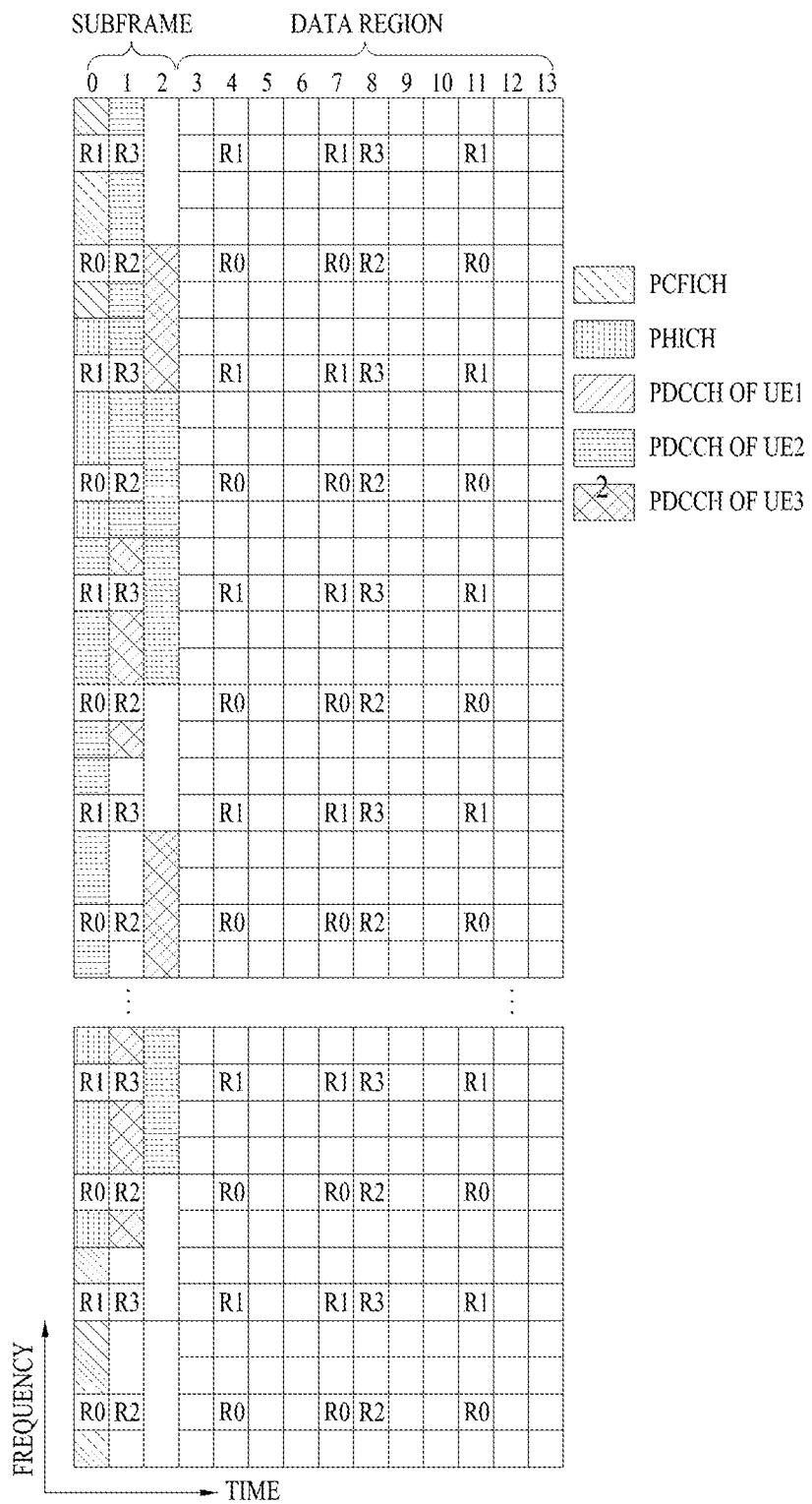
FIG. 5 illustrates a structure of a downlink (DL) subframe in an LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Here, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
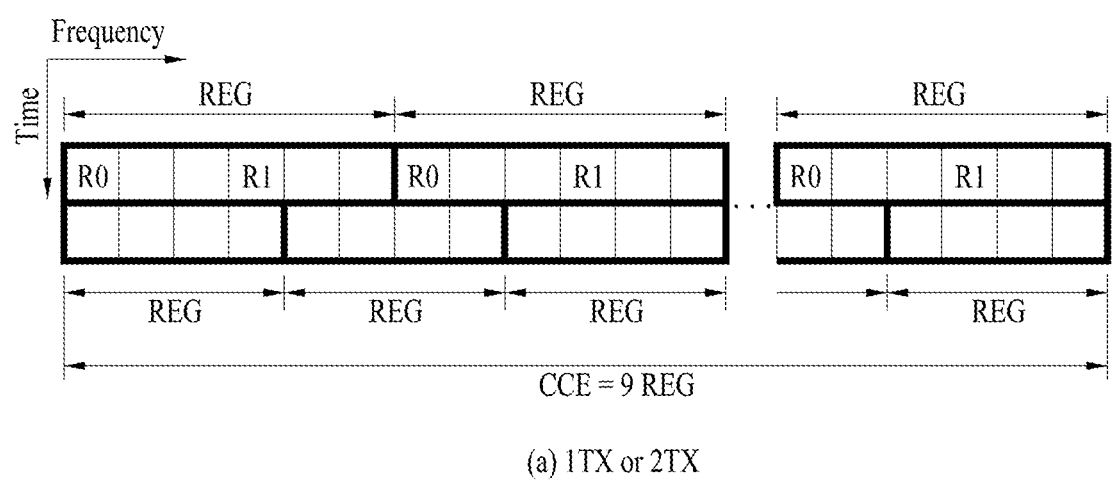
FIG. 6 illustrates a resource unit used to configure a DL control channel in an LTE system.
Figure 6:
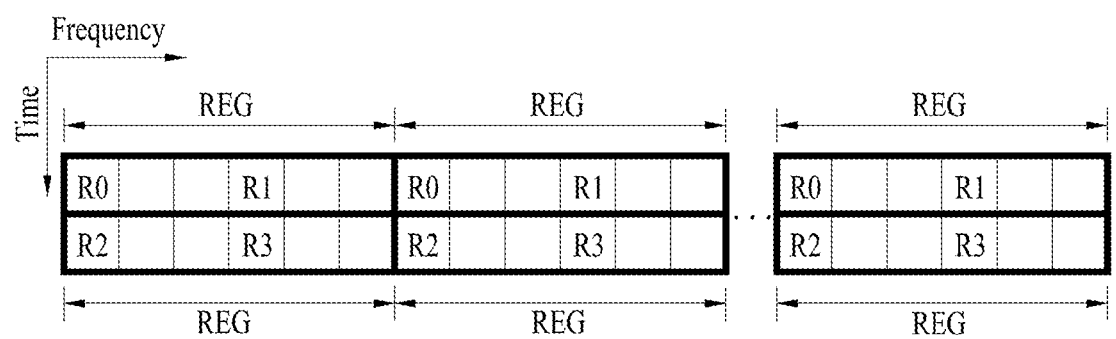

FIG. 6 illustrates a resource unit used to configure a DL control channel in an LTE system. Specifically, (a) of FIG. 6 illustrates the case in which the number of transmit antennas in an eNB is one or two and (b) of FIG. 6 illustrates the case in which the number of transmit antennas in an eNB is four. Only RS patterns differ according to the number of transmit antennas and resource units regarding control channels are configured in the same manner.

Referring to FIG. 6, a basic resource unit for a DL control channel is an REG. The REG includes 4 adjacent REs except for RSs. REGs are marked by bold lines. A PCFICH and a PHICH include 4 REGs and 3 REGs, respectively. A PDCCH is configured in units of a CCE and one CCE includes 9 REGs.

To determine whether a PDCCH having L CCEs is transmitted to a UE, the UE is configured to monitor $M^{(L)}(\geq L)$ contiguous CCEs or $M^{(L)}(\geq L)$ CCEs arranged according to a specific rule. The UE may consider a plurality of L values for PDCCH reception. CCE sets that the UE should monitor for PDCCH reception are called a search space. For instance, the LTE system defines search spaces as illustrated in Table 1.

TABLE 1

| Type | Search space $SL_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A CCE aggregation level L indicates the number of CCEs constituting a PDCCH, $S_k^{(L)}$ indicates a search space with the CCE aggregation level L, and $M^{(L)}$ indicates the number of PDCCH candidates to be monitored in the search space at the aggregation level L.

Search spaces may be categorized into a UE-specific search space accessible only by a specific UE and a common search space accessible by all UEs within a cell. A UE monitors common search spaces at CCE aggregation levels 4 and 8 and UE-specific search spaces at CCE aggregation levels 1, 2, 4 and 8. The common search space may overlap with the UE-specific search space.

For each CCE aggregation level, the position of the first CCE (a CCE having the smallest index) in a PDCCH search space allocated to a UE changes for the UE in every subframe. This is called PDCCH search space hashing.

The CCE may be distributed across a system band. More specifically, logically successive CCEs are input to an interleaver. The interleaver interleaves the input CCEs on an REG basis. Therefore, the frequency/time resources of one CCE are physically distributed across a total frequency/time area within a control region of a subframe. As a consequence, even though a control channel is configured with CCEs, interleaving is performed on an REG basis, thereby maximizing diversity and interference randomization gain.

Figure 7:
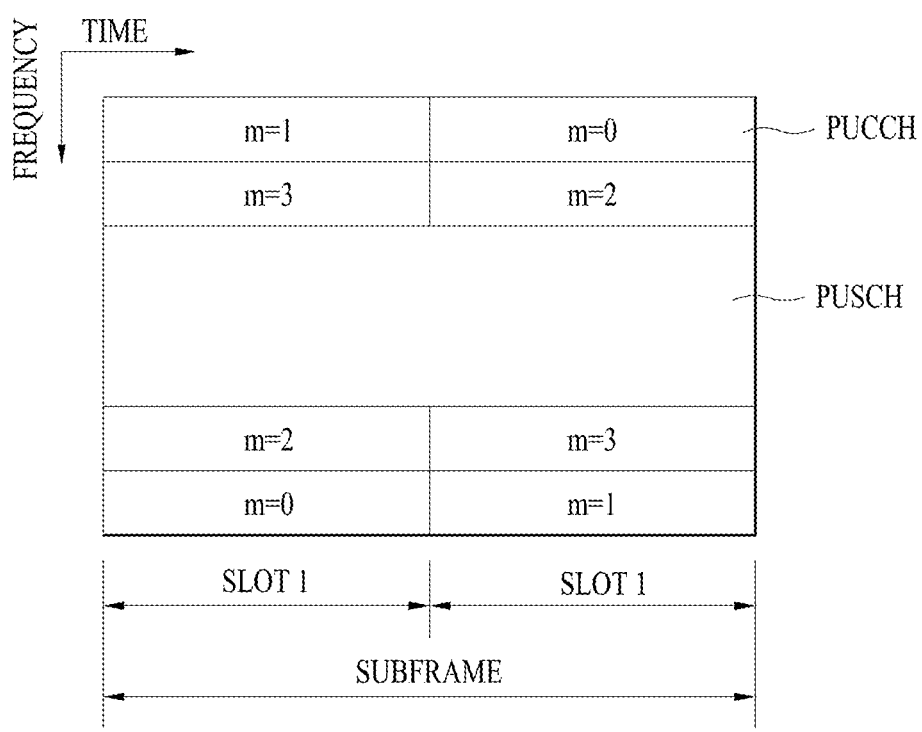
FIG. 7 illustrates a structure of an uplink (UL) subframe in an LTE system.

FIG. 7 illustrates a structure of a UL subframe in the LTE system.

Referring to FIG. 7, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one resource block (RB) having a different frequency in each slot of a subframe. That is, the two RBs allocated to the PUCCH frequency-hop over the slot boundary of the subframe. Particularly, PUCCHs with m=0, m=1, m=2, and m=3 are allocated to a subframe in FIG. 7.

Hereinafter, a method of mapping a modulation symbol of DCI to a physical resource according to an embodiment of the present disclosure will be described.

In a communication system, the eNB may instruct the UE to perform operations for data transmission and reception by transmitting the DCI through a PDCCH. In this case, the eNB may adjust the reliability of the DCI based on a channel environment fed back by the UE and transmit the DCI based on the adjusted reliability to the UE.

In this case, according to a channel coding method applied to the DCI and a DCI transmission method, there may be a mismatch between a configuration when the eNB has actually transmitted the DCI and a configuration assumed when the UE has successfully decoded the DCI. Then, this may affect, for example, an operation in which after succeeding in decoding the DCI, the UE attempts to perform decoding under the assumption that data is transmitted on a resource which is not used for the PDCCH. Therefore, it is necessary to consider a DCI transmission method considering a situation in which the configuration when the eNB has actually transmitted the DCI and the configuration when the UE has successfully decoded the DCI mismatch.

To this end, the present disclosure proposes a method capable of reducing ambiguity when the UE decodes the DCI in a communication system. Although an inventive feature and/or an embodiment in the present disclosure may be regarded as one proposed scheme, combinations of inventive features and/or embodiments may also be regarded as new schemes.

In a legacy LTE system for example, one or more symbols arranged in the front part of a 1-ms subframe are configured as a PDCCH and the eNB transmits the DCI to the UE through the configured PDCCH. According to the state of the channel through which the DCI is transmitted, the eNB configures a plurality of aggregation levels (ALs) and configures one or more candidate PDCCHs per AL, so as to aggregate one or more control channel elements (CCEs). The eNB transmits the DCI through one of the configurations and the UE attempts to decode the DCI through blind decoding (BD).

Such an operation may be equally applied even to an environment in which a system operates in a TTI different from that of the legacy LTE system. For example, the operation may be equally applied to a communication system operating in a short TTI (sTTI) which is shorter than a TTI of the legacy LTE system.

In the present disclosure, although a system having an sTTI unit is described by way of example, the features of the present disclosure are not limited to a such a system. In addition, a short REG (sREG), a short CCE (sCCE), short DCI (sDCI), etc. described in the present disclosure are not limitedly applied to the system having the sTTI unit and may be correspondingly applied to a normal REG, a normal CCE, normal DCI, etc. That is, the terms sREG, sCCE, sDCI, etc. used in the present disclosure may be interchangeably used with the normal REG, normal CCE, normal DCI, etc.

As a basic unit for transmitting the DCI in the sTTI environment, the sREG may be used. The sREG may be configured as one symbol in a time unit and one RB in a frequency unit.

A plurality of sREGs may constitute the sCCE and the sDCI may be transmitted using one or more sCCEs according to an AL. The DCI may be transmitted through a control RB set configured by the eNB. The control RB set may consist of various numbers of RBs and symbols according to configuration of the eNB. When the eNB transmits the DCI through one or more sCCEs corresponding to the AL, the eNB may contiguously map the sCCEs to physical resources included in the control RB set in a localized manner or non-contiguously map the sCCEs to physical resources included in the control RB set in a distributed manner.

Figure 8:
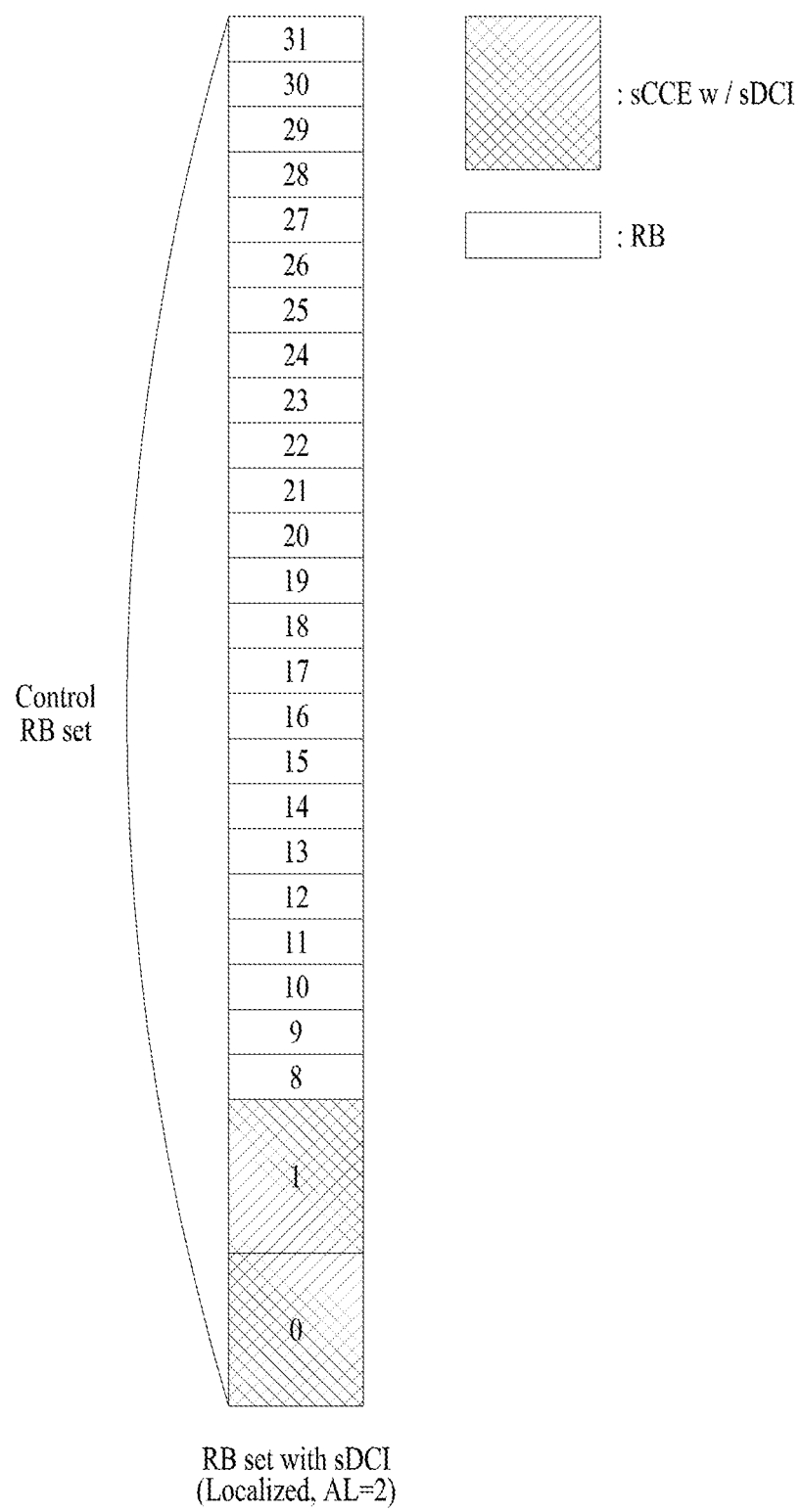
FIG. 8 illustrates an embodiment of mapping downlink control information.

FIG. 8 illustrates an embodiment of a mapping method of transmitting sDCI, in which an sCCE including DCI is configured as one symbol and a localized manner and sDCI is transmitted at an AL of 2.

In FIG. 8, a plurality of UEs may share one control RB set including 32 RBs. A search space of each UE may be configured in the control RB set by configuring sCCE indexes, using a hashing function defined in a system or through higher layer signaling. The UE may perform BD on candidate PDCCHs per AL, included in the search space thereof. If decoding is successful, the UE may perform an operation indicated by corresponding DCI.

However, if RBs constituting candidate PDCCHs of a higher AL and RBs constituting candidate PDCCHs of a lower AL overlap, the UE may incorrectly detect the DCI according to a channel coding scheme and a transmission method.

Figure 9:
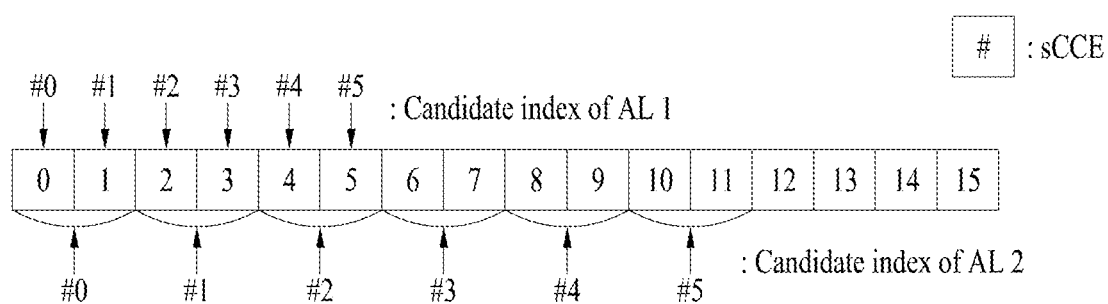
FIG. 9 illustrates an embodiment of a search space configuration for a DL channel according to an aggregation level (AL).

For example, assuming that candidate PDCCHs corresponding to AL=1 and AL=2 are configured as illustrated in FIG. 9 in the search space of the UE, although the eNB has transmitted sDCI through candidate PDCCH #1 of AL=2, the UE may successfully decode the DCI by attempting to decode candidate PDCCH #2 of AL=1 while performing BD on candidate PDCCHs corresponding to AL=1. This may occur when systematic bits are mapped to a front part upon sequential mapping of encoded DCI bits to REs corresponding to candidate PDCCHs. This case may occur even when starting sCCE indexes of respective ALs are not equal.

When a region except for an sCCE in which sDCI of the UE is transmitted in the control RB set is used for data transmission, since the UE has successfully decoded the sDCI in candidate PDCCH #2 of AL=1 in the above-described embodiment, the UE may attempt to decode data under the assumption that the data has been transmitted in the remaining region. In this case, the UE may incorrectly assume that data has been transmitted on a resource corresponding to sCCE index 3 in which the sDCI has actually been transmitted, thereby adversely affecting decoding of the data region.

Accordingly, various methods to prevent the above case may be considered. Simply, an AL used by the eNB may be directly indicated through physical layer signaling and/or higher layer signaling. For example, when the eNB informs the UE of a rate-matching pattern for the control RB set, AL information may also be indicated. The AL information of the sDCI for a corresponding UE may be implicitly or explicitly indicated through rat-matching information. Alternatively, a method of differently configuring a sequence scrambled with a CRC according to an AL may be considered.

As another scheme, a method of solving ambiguity through mapping of modulation symbols of the sDCI may be considered. For example, for one or more sCCEs constituting an sPDCCH according to an AL, a method of mapping the modulation symbols of the sDCI in reverse order starting from the last sCCE, i.e., an sCCE with the highest index, may be considered. Alternatively, in order to solve the ambiguity problem, the modulation symbols of the sDCI may be alternately mapped by distributing the modulation symbols of the sDCI on different sCCEs, without sequentially mapping the modulation symbols of the sDCI to sCCEs starting from the lowest sCCE among the sCCEs constituting the sPDCCH according to an AL. More specifically, when the modulation symbols are mapped, the modulation symbols may be interleaved at an RE level according to a pattern of order of selecting sCCE indexes constituting the sPDCCH at a specific AL and a pattern of order of selecting sREG indexes per sCCE.

Here, the pattern of order of selecting the sCCE indexes and the pattern of order of selecting the sREG indexes per sCCE may indicate that indexes are selected one by one while increasing indexes in ascending order.

Figure 10:
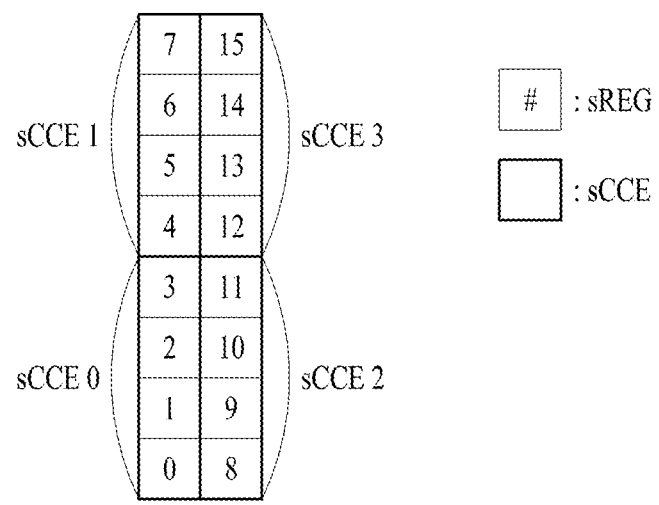
FIG. 10 illustrates mapping of modulation symbols of DL control information to a plurality of CCEs according to an embodiment of the present disclosure.

More specifically, when the eNB configures a control RB set as illustrated in FIG. 10 and transmits sDCI at AL=4, modulation symbols may be mapped as follows.

1) Embodiment 1: Method of Distributively Mapping Modulation Symbols to Respective sCCEs For example, mapping may be performed in order of 'first RE of sREG #0 of sCCE #0→first RE of sREG #4 of sCCE #1→first RE of sREG #8 of sCCE #2→first RE of sREG #12 of sCCE #3→first RE of sREG #1 of sCCE #0→first RE of sREG #5 of sCCE #1→ . . . '.

2) Embodiment 2: Method of Applying Pattern of Order of Selecting sREG Indexes Per sCCE Differently from Embodiment 1

For example, mapping may be performed in order of 'first RE of sREG #0 of sCCE #0→first RE of sREG #4 of sCCE #1→first RE of sREG #8 of sCCE #2→first RE of sREG #12 of sCCE #3→first RE of sREG #2 of sCCE #0→first RE of sREG #6 of sCCE #1→ . . . '.

3) Embodiment 3: Method of Applying Pattern of Order of Selecting sCCE Indexes Differently from Embodiment 1

For example, mapping may be performed in order of 'first RE of sREG #0 of sCCE #0→first RE of sREG #8 of sCCE #2→first RE of sREG #4 of sCCE #1→first RE of sREG #12 of sCCE #3→first RE of sREG #1 of sCCE #0→first RE of sREG #9 of sCCE #2→ . . . '.

The pattern of order of selecting the sCCE indexes, the pattern of order of selecting sREGs, and/or the pattern of order of selecting REs, in a candidate sPDCCH of a corresponding AL, may be variously configured. For example, when sCCE indexes, sREG indexes, or RE indexes are 0, 1, 2, 3, 4, 5, 6, and 7, modulation symbols may be mapped in order of 0, 4, 2, 6, 1, 5, 3, and 7 by maximally distributing the modulation symbols in ascending order.

The features of the disclosure may be configured in various manners through a combination of respective patterns of sCCEs, sREGs, and REs. For example, the pattern of order of selecting sREGs in an sCCE may be differently applied according to each sCCE. Although the above-described embodiments relate to a method of performing interleaving by selecting one sREG in one sCCE and/or one RE in one sREG, the features of the disclosure are not limited thereto. For example, mapping may be performed by selecting multiple sREGs in one sCCE and/or multiple REs in one sREG according to each pattern.

When modulation symbols of sDCI are mapped, interleaving may be performed at an sREG level according to the pattern of order of selecting sCCE indexes constituting an sPDCCH at a specific AL and the pattern of order of selecting sREG indexes per sCCE.

The pattern of order of selecting the sCCE indexes and the pattern of order of selecting the sREG indexes per sCCE may be select indexes one by one while increasing indexes in ascending order.

For example, mapping may be performed: 'mapping to multiple REs corresponding to sREG #0 of sCCE #0→mapping to multiple REs corresponding to sREG #4 of sCCE #1→mapping to multiple REs corresponding to sREG #8 of sCCE #2→mapping to multiple REs corresponding to sREG #12 of sCCE #3→mapping to multiple REs corresponding to sREG #1 of sCCE #0→mapping to REs corresponding to sREG #5 of sCCE #1→ . . . '. Here, the pattern of order of selecting REs in a corresponding sREG may be variously configured.

The patterns of order of selecting sCCE indexes, sREG indexes, and/or RE indexes at a corresponding AL may be predefined in a system in consideration of time diversity and/or frequency diversity or may be indicated by the eNB to the UE through higher layer signaling or physical layer signaling. The above-described patterns may be interpreted as selecting indexes in a time-first or frequency-first manner in terms of the time axis or frequency axis or interpreted as selecting sREGs in different sCCEs. Alternatively, the patterns may be interpreted as selecting REs in different sREGs in one sCCE or interpreted as selecting different REs in one sREG in one sCCE.

Figure 11:
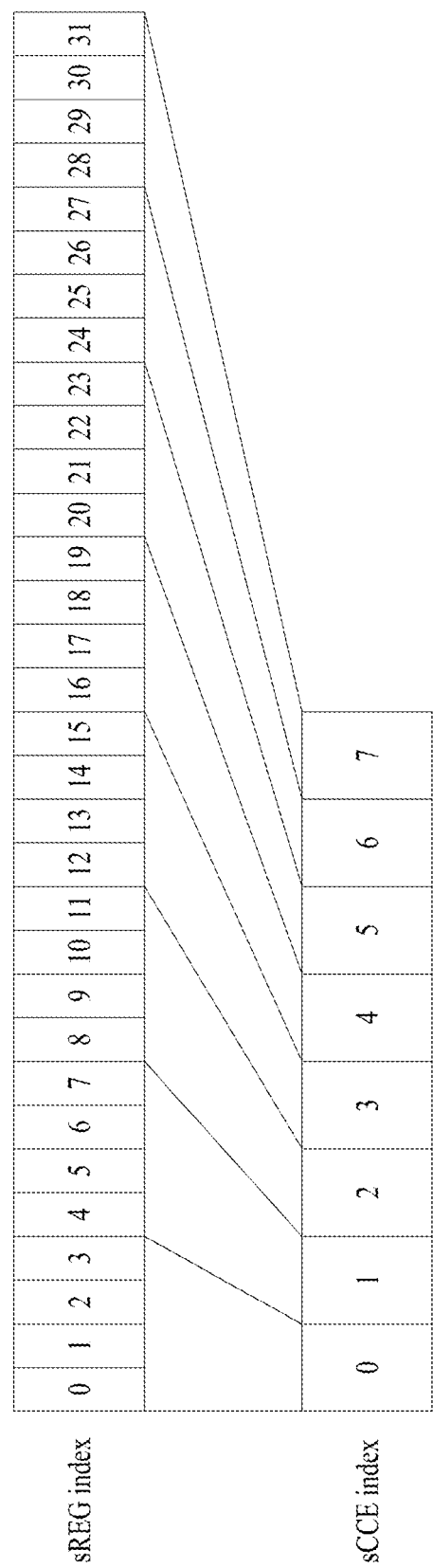
FIG. 11 illustrates an embodiment in which a plurality of sREGs constitutes an sCCE.

The above-described embodiment may be represented as an equation. For example, indexes of sCCEs corresponding to a DL control RB set configured for the UE and indexes of sREGs corresponding to an index of each sCCE may be indicated as illustrated in FIG. 11. An index of each sCCE and an index of an sREG may be interpreted as indexes in the logical domain.

When the total number of sCCEs corresponding to the size of the control RB set of the UE is X, a starting sCCE index of a specific AL of L in a search space of the UE is Y, the number of sREGs per sCCE is $N_{sREG}^{sCCE}$, the number of sREGs corresponding to the AL is $N_{sREG}^{AL}$, and an index of a modulation symbol is i, then an index of an sREG to which each modulation symbol index is to be mapped may be calculated as indicated in Equation 1 below.

$$\left[ Y \cdot N_{sREG}^{sCCE} + \left\lfloor \frac{i \bmod N_{sREG}^{AL}}{L} \right\rfloor + N_{sREG}^{sCCE} \cdot \{(i \bmod N_{sREG}^{AL}) \bmod L\} \right] \quad \text{[Equation 1]}$$
$$\bmod(X \cdot N_{sREG}^{sCCE})$$

Equation 1 may be expanded so that an index of an RE in an sREG to which a modulation symbol index is mapped may be calculated by Equation 2 below.

$$\left\lfloor \frac{i}{N_{sREG}^{AL}} \right\rfloor + \quad \text{[Equation 2]}$$

$$\left[ Y \cdot N_{sREG}^{sCCE} + \left\lfloor \frac{i \bmod N_{sREG}^{AL}}{L} \right\rfloor + N_{sREG}^{sCCE} \cdot \{(i \bmod N_{sREG}^{AL}) \bmod L\} \right] \bmod(X \cdot N_{sREG}^{sCCE})$$

Equation 1 and Equation 2 indicate an embodiment for representing the features of the present disclosure and it is apparent that the features of the present disclosure are not limited to the above equations. Although a description has been given in the present disclosure under the assumption that 4 sREG constitute one sCCE, the features of the present disclosure are not limited to such an assumption. That is, the number of sREGs constituting an sCCE may be variously changed.

Figure 12:
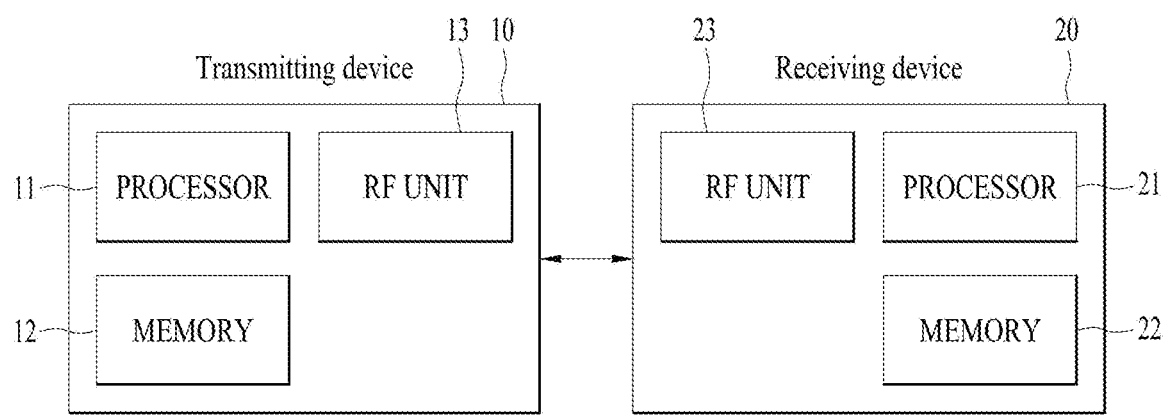
FIG. 12 is a block diagram illustrating components of a transmitting device 10 and a receiving device 20 configured to implement the present disclosure.

FIG. 12 is a block diagram illustrating components of a transmitting device 10 and a receiving device 20 configured to implement the present disclosure.

The transmitting device 10 and the receiving device 20 respectively include radio frequency (RF) units 13 and 23 for transmitting or receiving RF signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present disclosure.

The memories 12 and 22 may store programs for processing and control of the processors 11 and 21 and may temporarily store input/output information. The memories 12 and 22 may be used as buffers.

The processors 11 and 21 control the overall operation of various modules in the transmitting device or the receiving device. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under the control of the processor 21, the RF unit 23 of the receiving device 20 receives RF signals transmitted by the transmitting device 10. The RF unit 23 may include $N_r$ receive antennas and frequency down-converts each signal received through the receive antennas into a baseband signal. The RF unit 23 may include an oscillator for frequency down-conversion. The processor 21 decodes and demodulates the RF signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving RF signals from the exterior to transfer the RF signals to the RF units 13 and 23. The antenna may also be called an antenna port. Each antenna may correspond to one physical antenna or may be configured by a combination of more than one physical antenna element. A signal transmitted through each antenna may not be decomposed by the receiving device 20. An RS transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a multiple input multiple output (MIMO) function of transmitting and receiving data using a plurality of antennas may be connected to two or more antennas.

In the present disclosure, the RF units 13 and 23 may support reception beamforming and transmission beamforming. For example, the RF units 13 and 23 in the present disclosure may be configured to perform functions described with reference to FIGS. 1 to 11. In the present disclosure, the RF units 13 and 23 may be referred to as transceivers.

In the embodiments of the present disclosure, the UE operates as the transmitting device 10 on UL and as the receiving device 20 on DL. In the embodiments of the present disclosure, the eNB operates as the receiving device 20 on UL and as the transmitting device 10 on DL. Hereinafter, the processor, the RF unit, and the memory, included in the UE, will be referred to as a UE processor, a UE RF unit, and a UE memory, respectively, and the processor, the RF unit, and the memory, included in the eNB, will be referred to as an eNB processor, an eNB RF unit, and an eNB memory, respectively.

The eNB processor of the present disclosure alternately maps modulation symbols for sDCI by distributing the modulation symbols on different sCCEs. More specifically, when the modulation symbols are mapped, mapping may be performed by interleaving the modulation symbols at an RE level according to a pattern of order of selecting sCCE indexes constituting an sPDCCH at a specific AL and a pattern of order of selecting sREG indexes per sCCE. The pattern of order of selecting the sCCE indexes and the pattern of order of selecting the sREG indexes per sCCE may select indexes one by one while increasing indexes in ascending order.

As described above, the eNB processor controls the transceiver to transmit the modulation symbols mapped to respective sCCEs to the UE.

The UE processor of the present disclosure controls the transceiver to receive sDCI received under control of the eNB processor. The UE processor decodes the sDCI under the assumption that the modulation symbols for the sDCI are mapped by alternately distributing the modulation symbols on a plurality of sCCEs. That is, the UE processor decodes the sDCI based on order of the modulation symbols mapped by the eNB processor. Specifically, the UE processor may decode the sDCI at an RE level according to the pattern of order of selecting sCCE indexes constituting the sPDCCH at a specific AL and the pattern of order of selecting the sREG indexes per sCCE. The pattern of order of selecting the sCCE indexes and the pattern of order of selecting the sREG indexes per sCCE may select indexes one by one while increasing indexes in ascending order.

As mentioned in the foregoing description, the detailed descriptions for the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations can be made therein without departing from the spirit and scope of the disclosure. Therefore, the present disclosure is not limited by the embodiments disclosed herein but intends to give the broadest scope matching the principles and new features disclosed herein.

INDUSTRIAL APPLICABILITY

While the above method of transmitting and receiving the DCI and the apparatus therefor have been described based on an example applied to a 3GPP LTE system, the method and apparatus may be applied to various wireless communication systems in addition to the 3GPP LTE system.

The invention claimed is:

1. A method performed by a user equipment (UE) in a wireless communication system, the method comprising:
receiving downlink control information (DCI) through a plurality of control channel elements (CCEs) based on an aggregation level for a physical downlink control channel (PDCCH); and
receiving a physical downlink shared channel (PDSCH) based on resource allocation information included in the DCI,
wherein the PDCCH is masked by a radio network temporary identifier (RNTI) for the UE,
wherein each of the plurality of CCEs comprises a plurality of resource element groups (REGs),
wherein each of the plurality of REGs comprises a plurality of resource elements (REs),
wherein the DCI is mapped to a first RE included in a first REG and then mapped to a second RE included in a second REG,
wherein the first REG and the second REG are included in different CCEs,
wherein the DCI is cyclically mapped to the plurality of CCEs based on a modulo operation related to the aggregation level, and
wherein an index of a CCE in which the first REG is included and an index of a CCE in which the second REG is included have an interval therebetween corresponding to a first specific offset.

2. The method of claim 1, wherein an index of the first REG and an index of the second REG have an interval therebetween related to a second specific offset.

3. The method of claim 1, wherein a first modulation symbol of the DCI is mapped to the first RE and a second modulation symbol of the DCI is mapped to the second RE.

4. A user equipment (UE) configured to operate in a wireless communication system, the UE comprising:
at least one processor; and
at least one memory coupled with the at least one processor and storing instructions that, when executed by the at least one processor, perform operations comprising:
receiving downlink control information (DCI) through a plurality of control channel elements (CCEs) based on an aggregation level for a physical downlink control channel (PDCCH); and
receiving a physical downlink shared channel (PDSCH) based on resource allocation information included in the DCI,
wherein the PDCCH is masked by a radio network temporary identifier (RNTI) for the UE,
wherein each of the plurality of CCEs comprises a plurality of resource element groups (REGs),
wherein each of the plurality of REGs comprises a plurality of resource elements (REs),
wherein the DCI is mapped to a first RE included in a first REG and then is mapped to a second RE included in a second REG,
wherein the first REG and the second REG are included in different CCEs,
wherein the DCI is cyclically mapped to the plurality of CCEs based on a modulo operation related to the aggregation level, and
wherein an index of a CCE in which the first REG is included and an index of a CCE in which the second REG is included have an interval therebetween corresponding to a first specific offset.

5. The UE of claim 4, wherein an index of the first REG and an index of the second REG have an interval therebetween related to a second specific offset.

6. The UE of claim 4, wherein a first modulation symbol of the DCI is mapped to the first RE and a second modulation symbol of the DCI is mapped to the second RE.

7. A base station (BS) configured to operate in a wireless communication system, the BS comprising:
at least one processor; and
at least one memory coupled with the at least one processor and storing instructions that, when executed by the at least one processor, perform operations comprising:
sequentially mapping downlink control information (DCI) to a first resource element (RE) of a first resource element group (REG) and a second RE of a second REG,
wherein the first REG and the second REG are included in a plurality of CCEs based on an aggregation level for a physical downlink control channel (PDCCH);
transmitting, to a user equipment (UE), the DCI mapped to the plurality of CCEs; and
transmitting, to the UE, a physical downlink shared channel (PDSCH) related to resource allocation information included in the DCI,
wherein the PDCCH is masked by a radio network temporary identifier (RNTI) for the UE,
wherein each of the plurality of CCEs comprises a plurality of REGs,
wherein each of the plurality of REGs comprises a plurality of REs,
wherein the first REG and the second REG are included in different CCEs,
wherein the DCI is cyclically mapped to the plurality of CCEs based on a modulo operation related to the aggregation level, and
wherein an index of a CCE in which the first REG is included and an index of a CCE in which the second REG is included have an interval therebetween corresponding to a first specific offset.

8. The BS of claim 7, wherein an index of the first REG and an index of the second REG have an interval therebetween related to a specific offset.

9. The BS of claim 7, wherein a first modulation symbol of the DCI is mapped to the first RE and a second modulation symbol of the DCI is mapped to the second RE.

* * * * *